July 16, 1929.                A. C. MENNINGEN                1,720,849
                    TRACTION CONTROL AND DRIVING MECHANISM
                    Filed July 15, 1925        4 Sheets-Sheet 1

July 16, 1929.  A. C. MENNINGEN  1,720,849
TRACTION CONTROL AND DRIVING MECHANISM
Filed July 15, 1925    4 Sheets-Sheet 4

Inventor
A. C. Menningen
By Robb, Robb & Hill
Attorneys

Patented July 16, 1929.

1,720,849

UNITED STATES PATENT OFFICE.

ADOLPH C. MENNINGEN, OF MILWAUKEE, WISCONSIN, ASSIGNOR TO KOEHRING COMPANY, OF MILWAUKEE, WISCONSIN, A CORPORATION.

TRACTION CONTROL AND DRIVING MECHANISM.

Application filed July 15, 1925. Serial No. 43,869.

This invention embodies a steering mechanism and control means therefor, designed especially for heavy machines such as tractors, concrete pavers, cranes, shovels and the like. In its practical embodiment, the steering mechanism hereof, is especially adapted for the control of the movement of endless traction devices that are now being commonly employed as the portable traction supporting means for heavy machines of the types above referred to.

By the use of the invention, I am enabled to drive the customary spaced endless traction devices or belts at the same time and at the same speed for forward or rearward propulsion of the machine equipped with said devices. When it is desired to turn the machine to the right, or to the left, my mechanism permits of discontinuing of the power as supplied to one of the traction devices whilst the other is driven. Under these conditions, obviously, the machine equipped with the endless traction devices will turn in the direction of the side at which the non-driven traction device is located, in a manner well known to those versed in this act. Under the conditions stated, the machine will be steered, of course, in the direction of the side at which the idle traction device is disposed. The steering or turning effect thus produced will be upon a rather large steering radius, so that I make provision in my mechanism for braking, or actually locking against movement, the idle traction device, thereupon the steering radius of the machine may be controlled for a more or less sharp turn, dependent upon the degree of braking effect produced on said traction device or whether it is locked from movement. When locked from movement, the machine equipped with traction devices, one of which is so locked, will turn practically upon said idle locked traction device.

An essential novel feature of my invention is the provision of clutch mechanism between the traction devices and suitable power driving means therefor, with control means for the operation of the clutch mechanism such that the driving power of the machine is utilized to do the work of actually shifting a particular clutch for either traction device, in order to unclutch it from the driving shaft or member. Since in these large machines the effort required to unship a heavy clutch is great, the advantage of being able to use the power driving means to do this work, under simple manual control of its function, is self evident.

My invention includes also novel braking instrumentalities that not only control the shifting out of the clutch means in the manner previously set forth, but additionally act with a braking function upon certain driving connections between the power driving member and the traction devices, to produce the effect of variably braking the traction devices at will to slow them down, or to positively lock either of them against movement.

The invention also comprises other novel provisions of importance, including a peculiarly advantageous construction of clutch and brake unit wherein the parts are assembled with a special view to economy of space, said parts also being especially designed with a view to simplicity, strength and efficiency of operation. Additionally, the invention includes peculiar control mechanism whereby with the operation of a single control steering member the clutches for both traction devices may be rendered alternatively effective or ineffective, utilizing the power driving force to effect the unclutching operation thereof as previously outlined, said steering control member also controlling the action of the brake means in performing its braking and locking functions respecting the endless traction devices. There are other detail features of construction of my mechanism possessed of novelty and these along with those hereinbefore presented, will be understood clearly upon reference to the accompanying drawings in which:

Figure 3 is an end elevation of the parts illustrated in Figures 1 and 2.

Referring to the drawings and describing the various features of my invention specifically, I designate the portion of the frame of the machine equipped with my invention by the reference character A. Since the particular form of the endless traction devices with which my invention is used, is not material hereto, said devices are not shown. It is notable however that the endless traction devices are turned or operated by means of driving sprockets 1, seen best in Figure 4, as carried by sprocket sleeves 2 which are freely rotatable on the opposite ends of the jack shaft 3. Sprocket chains 4 lead from the sprockets 1, which are double sprockets, down to suitable sprocket means, not shown, on the sprockets or tumbler shafts, of the endless traction devices for transmitting the driving forces from the sleeves 2 to said traction devices. Of course the sleeves 2 might be employed to directly operate traction means such as rollers or wheels or endless belts, as described, by gearing said sprocket sleeves directly to the wheels or traction devices. Such construction is known and therefor is not illustrated herein, it being understood merely that the sleeves 2 are intended as the driving devices for the traction members, whether the latter are rollers or endless belts. The shaft 3 is mounted on the frame A by being supported in suitable bearing 5 or in any other substantial manner desired. Loosely carried by said shaft 3 at its middle portion, is the driving bevel gear 6 having the hub 6ª, and meshing with the operating bevel gear 7 carried by the actuating shaft 8 that is driven by the engine or power plant mounted on the frame A or used in any suitable way for propelling the machine equipped with the invention. The driving gear 6 is of peculiar formation, in order that it may act both as a driving gear and as a clutch member. For the above purpose the portion of the gear 6 between its gear teeth and its hub 6ª, is formed so as to provide a double clutch member 6ᵇ, the formation comprising primarily a series of openings in the body of the gear providing at its opposite sides, oppositely and outwardly facing clutch teeth and openings.

Cooperating with the double clutch member 6ᵇ of the gear 6 are the spaced clutch members 9 and 10, located on opposite sides of the gear, these clutch members having sleeves 11 which are provided each with two diametrically opposite keys 12 by which they are keyed onto the sprocket adjacent sleeves 2. The keys 12 are seen best in Figure 6 and provide a feather and spline connection between each clutch member 9 and 10, and its adjacently located sprocket sleeve 2.

From the foregoing, it will be seen that the gear 6 when driven will transmit driving forces to both the sprocket sleeves 2, and their sprocket gears 4 when the clutch members 9 and 10 are interlocked or clutched with the double clutch member 6ᵇ of the gear 6. The said clutch members 9 and 10 are normally maintained in clutching engagement with the gear 6 by means of coiled springs 13 which encircle the sprocket sleeves 2, each spring being interposed between the hold flange 14 projecting from each sprocket sleeve and the outer end of the clutch sleeve 11 adjacent thereto.

Encircling the sprocket sleeves 2 and enclosing the clutch sleeves 11 of the clutch members 9 and 10, also enclosing or housing the springs 13 partially, are the brake drums 15 and 16. Said brake drums have a bearing upon the clutch members 9 and 10 and each drum is provided with a holding plate 17, bolted or otherwise secured thereto at 18, and overlapping the outermost portion of the flanges 14 on the sprocket sleeves 2. The said holding plates 17 maintain the brake drums 15 and 16, with their respective housing members 15ª and 16ª, in proper positions upon the parts 2 and 11, permitting however a free rotative movement of the brake drums relatively to said parts. The brake drums 15 and 16 have means thereon for engaging the clutch members 9 and 10 respectively for causing unclutching operation of said clutch members, through the application of the driving forces imparted thereto from the gear 6. These interengaging means will now be set forth.

Figure 4:
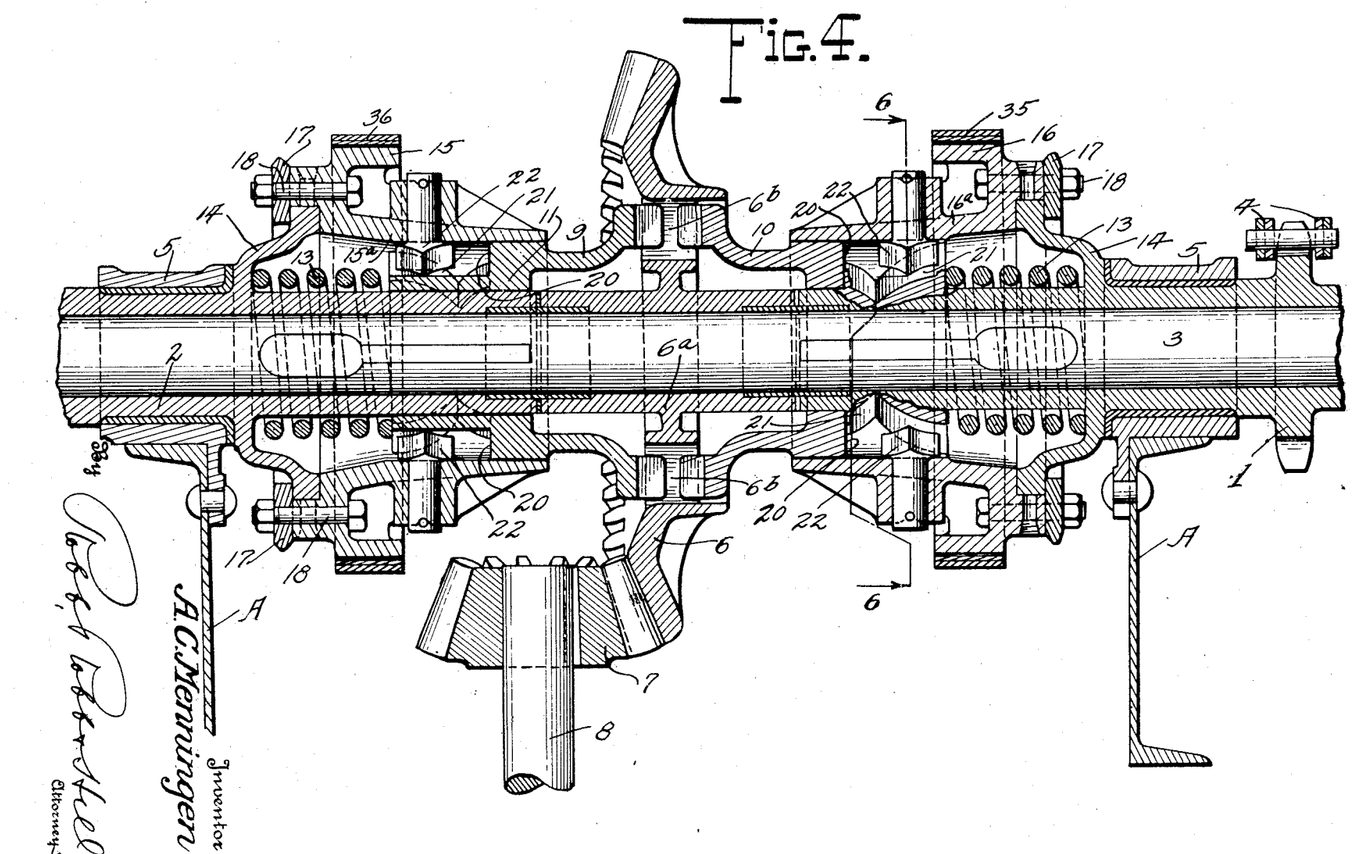
Figure 4 is an enlarged sectional view taken through the jack shaft showing the drive gearing for the sprockets which operate the endless traction devices, and the peculiar clutch and brake instrumentalities employed in connection therewith.
Figure 5:
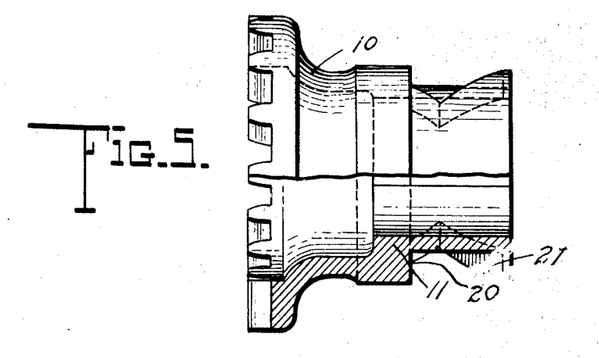
Figure 5 is a view showing one of the movable clutch members.
Figures 6, 7, 8, 9:
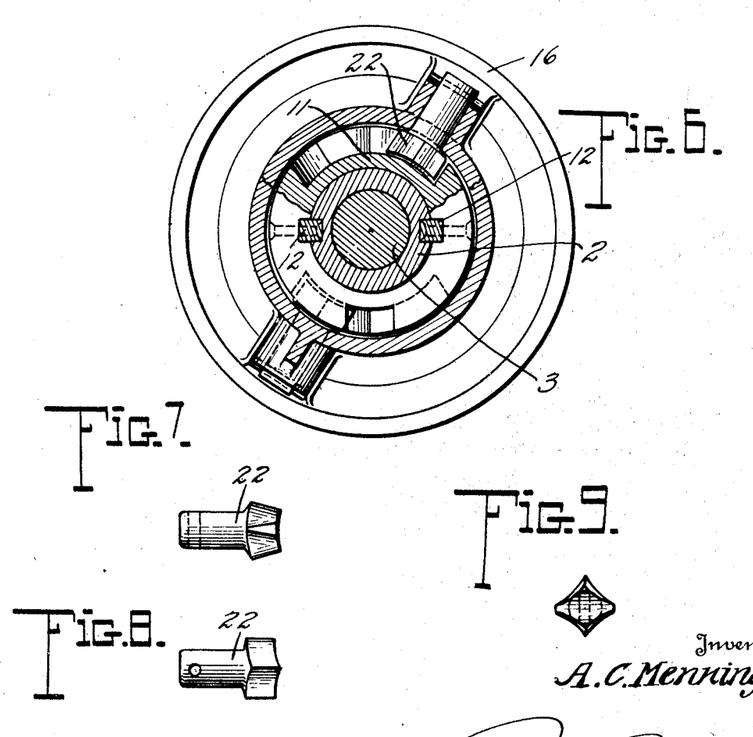
Figure 6 is a sectional view taken about on the line 6—6 of Figure 4.
Figures 7, 8 and 9 are views of the camming member, two of which are carried by each of the brake drums.

As shown in Figure 4 and in Figure 6, each clutch member 9 and 10 is provided with a recess 20 having inclined walls which provide cams 21. The brake drum 15 cooperating with the clutch member 9 has an abutment or camming head 22 projecting inwardly from the housing portion 15ª thereof and entering the recess 20 of the member 9. This camming head cooperates with the cam walls 21 of the recess 20 so that if the gear 6 is clutched to the clutch member 9 and driving the same, thereby driving the adjacent sprocket sleeve 2 and sprocket gear 4, the brake drum 15 will turn with the clutch member 9 through the interlocking connection 20 and 22. If however the brake drum 15 is retarded in its movement, or stopped, the abutment 22 or camming head thereof is correspondingly retarded or stopped creating a relative movement between said part and the clutch sleeve 11 of the clutch member 9. Such relative movement brings the cam walls 21 into such cooperation with the camming head 22 that owing to the continued driving force imparted to the clutch member 9, and the relative movement of the camming head 22, said head will act on the walls 21 of the recess 20 to shift the clutch member 9 longitudinally of the sleeve 2 on which it is mounted against the expansive action of the spring 13, and thereby unclutch said clutch member 9 from the gear 6.

When the gear 6 is unclutched from the clutch member 9, the driving force previously transmitted from said gear to the sprocket sleeve 2 and gear 4 of the member 9 is discontinued. The endless traction member driven theretofore by the clutch member 9, will no longer be so driven.

It is to be understood that I provide between the brake drum 15 and the clutch member 9 two of the abutments or camming heads 22 and they are at diametrically opposite sides of the housing 15ª, to fit into recesses 20 at correspondingly opposite points in the sleeve 11 of the clutch member 9. Moreover this same arrangement of the parts 20 and 21 and 22, is employed between the brake drum 16 and the clutch member 10, so it is not necessary to repeat the particular description of said parts as thus used.

It being understood that the actual driving power transmitted to the gear 6 will be availed of to unclutch either of the clutch members 9 and 10 from said gear, by retarding or stopping the movement of the brake drums 15 and 16 respectively, the control means for the brake drum will now be set forth, and the braking and locking functions of the brake drums elucidated.

Figure 1:
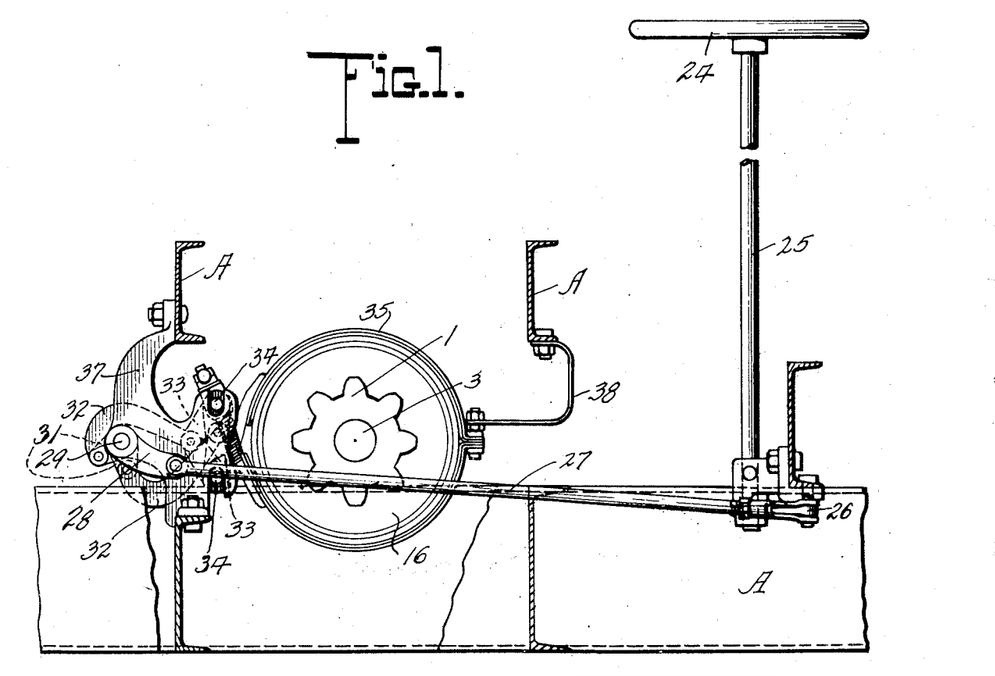
Figure 1 is a side elevational view of the frame of a portable machine showing the features of my invention embodied in said machine.
Figure 2:
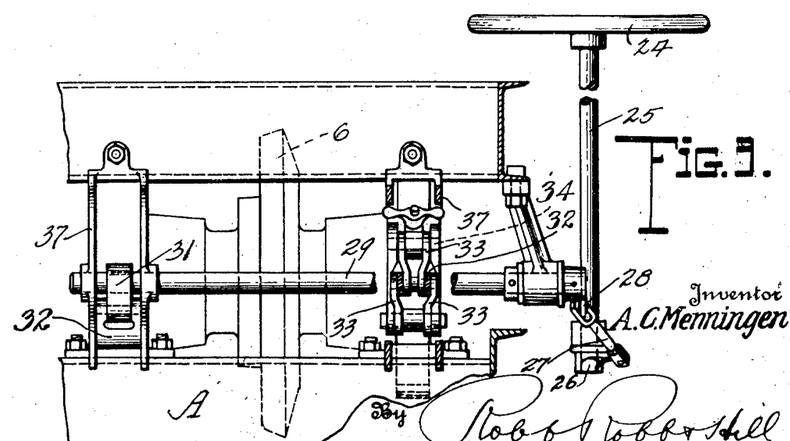
Figure 2 is a top plan view of the parts generally illustrated in Figure 1.

Referring to Figures 1 and 2, it will be seen that I provide a steering wheel 24 carried by a steering post 25 and suitably mounted on the frame A. The post 25 carries an arm 26 connected by a link rod 27 with an arm 28 on a rock shaft 29 mounted in suitable bearings in the frame A, in parallel relation to the jack shaft 3. Secured to the rock shaft 29 are the rigid actuating lever arms 30 and 31. which are disposed at about a 70 degree angle to one another. The lever arm 30 is connected by a link 32 with a pair of toggle links 33. The point of connection of the link 32 with the toggle links 33, is a point of connection between corresponding ends of the said links, the opposite ends of said links being attached to the opposite ends of the brake band 35 as shown at 34.

The lever arm 31 is connected by link 32 like that previously described to a pair of toggle links 33 which coact in a manner like that set forth, with a brake band 36. The brake bands 35 and 36 encircle the braking drums 16 and 15 respectively and said brake bands are supported by their free ends having suitable connection with brackets 37 which are mounted on the frame A. Intermediate its ends, each brake band 35 and 36 is supported by means of a spring hanger 38 which is carried by the frame A also. The hanger 38 for each brake band, is located at the opposite side of the adjacent brake drum to that at which the toggle links are located. The brackets 37 are of peculiar form and actually support the shaft 29 with its arms 30 and 31, the links 32 and the links 33 and brake bands 35 and 36. The ends of the brake bands 35 and 36, which are connected with the toggle links 33, are free to move in slots in the brackets 37, enabling the brake bands to be equally effective for operation upon their brake drums 15 and 16, when the said drums turn in either of opposite directions, this depending on whether the sprocket sleeves 2 are driven for forward or rearward propulsion of the machine. Obviously, the gear 6 may be operated forwardly or backwardly for the above purpose.

Figures 10, 11, 12:
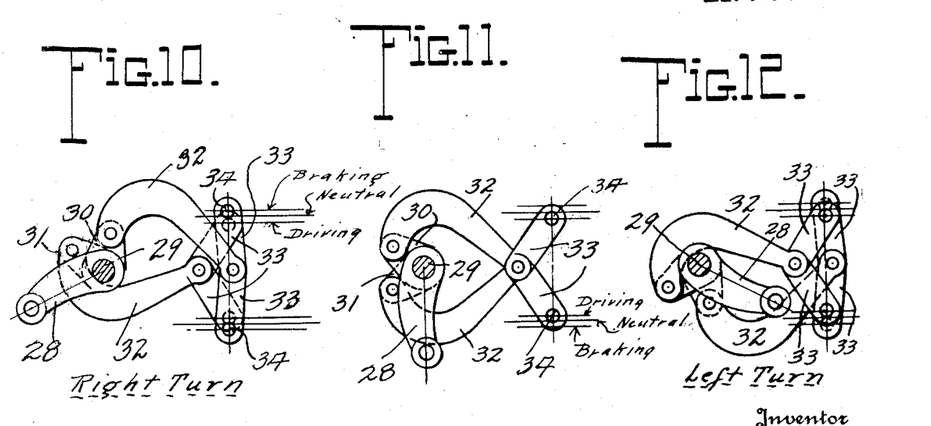
Figures 10, 11 and 12 are views showing the lever and link connections between the brake bands and the actuating shaft therefor, the said views respectively showing the positions of the lever arms when turning the machine to the right, when the machine is progressing in a straight line and when the machine is turning to the left.

Figures 10, 11, and 12 illustrate clearly that the links 32 are peculiarly curved, and the ends of the links 32 which are connected with the lever arms 30 and 31 move on arcs generated about the axis or shaft 29. During a certain portion of the movement of each link 32, as illustrated in Figure 11, the end of the link connected with its lever arm moves on a neutral arc at which time the link does not materially shift the toggle links 33 connected therewith. Under these conditions, the brake band attached to said toggle links is not applied to its drum. When, however, each link 32 is shifted by its lever arm to travel on the effective actuating arc of the movement of the lever arm, it is clear that the toggle links 33 will be forcibly moved. If the travel of the lever arm is toward the brake drum, the links 33 will straighten out and apply the adjacent brake band whereas if the travel of the lever arm is away from the brake drum the links 33 will move into angular relation to one another and release the brake bands with which they are connected. When the parts are in the position illustrated in Figure 11, neither brake band 35 or 36 is effective. In the position of the parts in Figure 10, one of the brake bands is applied for turning of the machine to the right, and in the position of the parts as per Figure 12 the other of the brake bands is applied for turning of the machine to the left.

With the foregoing presentation of the construction of the invention, the general operation of the same may be briefly set forth. Assuming that the clutch and brake parts are engaged as shown in Figure 4, it is evident that both of the sprocket sleeves 2 are being driven in the same direction and with the same velocity so that the two endless traction members, not illustrated, which are operated by the sprocket gears 4 at the outer ends of the sleeves 2, will travel in the same direction and at the same speed under the actuation of the driving gear 6.

If the operator turns the steering wheel 24 in the proper direction to apply the brake band 35 to the drum 16, the turning of the drum 16 will be initially retarded causing a relative movement of the drum and the clutch sleeve 11 of the clutch member 10. Thereupon the camming devices 22 will cooperate with the cam walls 21 of the clutch sleeve 11 and the continued driving action of the clutch member 10 at a speed greater than the speed of the drum 16 will cause the camming devices 22 to shift the clutch member 10 out of engagement with the gear 6. In this way the drive on the endless traction device previously operated by the clutch member 10, will be discontinued and said traction device will idle and a steering action of the machine toward the side at which said traction device is located will take place. The radius of turning of the machine in said steering action depends upon the degree of force exerted in applying the brake band 35 to the brake drum 16. As the brake drum 16 is positively connected with the clutch member 10 and the clutch member 10 is positively connected with the sprocket sleeve 2, it will be clear that if the brake drum 16 is slowed down in its rotation or positively locked against rotation, a similar action will be exerted upon the parts 10 and 2 with which said brake drum cooperates, and these parts may be thus correspondingly braked or locked against movement. In this way the radius of turning of the machine may be controlled with considerable nicety so as to steer the machine accurately and easily. This is true especially because the expenditure of very slight force in applying the brake band 35 to the drum 16 causes the power or driving force applied to the gear 6 to unclutch the clutch member 10 and maintain it unclutched and free for the application of whatever braking force the operator may wish to apply to the drum 16 by turning the steering wheel 24.

It is obvious that a turning of the steering wheel 24 in a direction opposite to that just above described will result in an application of the brake band 36 to the brake drum 15, and an opposite steering movement of the machine to that above described will be the result. The control of both brake bands 35 and 36 by the steering wheel is identical so that the particular actions of the clutch member 9 and associated parts 15, 25, 21, etc., do not have to be additionally set forth.

The steering wheel 24 constitutes a common control device controlling the driving of the machine equipped with the invention in a straight line either forwardly or backwardly according to the direction and rotation of the gear 6 and to the right or left dependent upon which way the steering device 24 is rotated.

Suitable adjustment of the brake bands 35 and 36 may be effected by the usual adjusting screw and nut means carried by one end of each brake band.

It will be understood that the shaft 3 performs no driving function whatever. This shaft is merely a means for supporting various sprocket and clutch sleeves, brake drums, springs and gears. It forms a convenient means for assembling all of the said parts in proper alinement and supported for proper cooperation, in fact said shaft with said parts carried thereby, constitutes an exceedingly advantageous unit assembly of the main effective operating parts of my invention, with which parts my control mechanism is connected.

The brake drums 15 and 16, with their parts 15ᵃ respectively, constitute carriers for the camming means of the invention as will be quite clear in view of the foregoing description. These brake drum carriers, by their relative movement in regard to the clutch members, render the clutch means effective or ineffective at will.

Having thus described my invention, what I claim as new, and desire to cover by Letters Patent is:—

1. In a driving and brake mechanism for traction devices, in combination, a main driving gear, clutch members at opposite sides of said driving gear, means normally to hold said clutch members in engagement with the driving gear, driven gears one with each traction device to be controlled by the mechanism, a driving connection between each driven gear and an associated clutch member, camming means cooperative with each clutch member for camming the same to unclutch it from the driving gear, and a common control member for operating said camming means, the means intermediate said control member and the camming means consisting of brake devices, one for each clutch member and cooperating with its particular camming means, and means whereby the brake device may act on the driven gears.

2. In a driving and brake mechanism for traction devices, in combination, a main driving gear, clutch members at opposite sides of said driving gear, means normally to hold said clutch members in engagement with the driving gear, driven gears one with each traction device to be controlled by the mechanism, a driving connection between each driven gear and an associated clutch member, camming means cooperative with each clutch member for camming the same to unclutch it from the driving gear, and a common control member for operating said camming means, the means intermediate said control member and the camming means consisting of brake devices, one for each clutch member and cooperating with its particular camming means, together with carrier for the camming means to which carriers the brake devices may be applied for rendering the camming means individually operative to perform the unclutching action thereof in respect to its unclutched member.

3. In a driving and brake mechanism for traction devices, in combination, a main driving gear, clutch members at opposite sides of said driving gear, means normally to hold said clutch members in engagement with the driving gear, driven gears one with each traction device to be controlled by the mechanism, a driving connection between each driven gear and an associated clutch member, camming means cooperative with each clutch member for camming the same to unclutch it from the driving gear, and a common control member for operating said camming means, the means intermediate said control member and the camming means consisting of brake devices, one for each clutch member and cooperating with its particular camming means, together with carrier for the camming means to which carriers the brake devices may be applied for rendering the camming means individually operative to perform the unclutching action thereof in respect to its unclutched member and a common axis on which said clutch members, camming devices driving and driven gears are mounted.

4. In a driving and control mechanism for traction devices, in combination, a shaft, a driving gear on said shaft opposing clutch members on said shaft at opposite sides of said gear, carriers rotative around said shaft, one for each clutch member, camming means for each clutch member cooperative therewith to unclutch it from the gear and means connecting the carrier means with the camming means for controlling the cooperation of each camming means with its clutch member, springs normally holding the clutch members engaged with the driving gear, brake means cooperative with the carriers for causing the camming means to unclutch the clutch members at will and to retard or stop the carriers at will, and gear members connected with the carriers and adapted to be connected with the driving gear by the clutch members.

5. In a traction device operating and control mechanism, in combination, a driving member and operating means therefor, separate clutches each cooperative with a single traction device and arranged for clutching engagement with said driving member, driven members controlled by the clutches, camming means cooperative with each clutch member for unclutching it from the driving member, and manual means for controlling said camming means to cause the driving member to act upon either clutch device to effect its unclutching action aforesaid, and carriers for the camming means operable to brake the driven members controlled by the clutch members.

6. In a traction device operating and control mechanism, in combination, a driving member and operating means therefor, separate clutches each cooperative with a single traction device and arranged for clutching engagement with said driving member, camming means cooperative with each clutch member for unclutching it from the driving member, and manual means for controlling said camming means to cause the driving member to act upon either clutch device to effect its unclutching action aforesaid, together with a brake controlled by said manual means for each clutch and adapted to be applied to said clutch after it is disengaged by the driving force of the driving member, and driven members acted on by the brake means of the clutches.

7. In traction device and control mechanism of the class described, in combination, drive gearing, driven gears for operation of traction devices, clutch mechanisms intermediate the driven gears and the drive gearing, a steering member and means intermediate the steering member and said clutch mechanisms to throw either clutch mechanism out of action, together with means for application of braking forces to the driven members through said clutch mechanisms after either of them has been thrown out and rendered inoperative to perform its clutching function including camming devices for parts of the clutch mechanism having connections to rotate with the driven members.

8. A traction device driving mechanism comprising a shaft, a driving gear loose thereon, clutch members, engageable with said driving gear and at opposite sides thereof upon the said shaft, driven gears, having means by which they carry the clutch members to rotate therewith and also mounted on said shaft, means supported by said shaft for acting upon the clutch members to unclutch them, comprising brake drums having camming means to shift the clutch members out of engagement from the driving gear, and springs acting on the clutch members to normally hold them engaged with the driving gear, together with means controlling said brake drums including braking parts operable for the dual function of shifting the clutch members for the unclutching aforesaid and also to retard and stop rotation of the driven gears, and means positively connecting the driven gears with the brake drums.

9. A driving assembly for tractor machines, comprising a shaft, upon which the assembly is disposed, said assembly including a driving member loose on the shaft, and clutching and braking sub-assemblies at each side of said driving member, each sub-assembly including a clutch part directly cooperative with the driving member, a carrier associated with said clutch part and having fixed thereto a driven member for operating a traction device, spring means intermediate the carrier and clutch part to normally hold the same in coaction with the driving member, camming means carried by said carrier for relative movement and cooperation respecting the clutch part and adapted when the carrier is retarded or stopped in movement to act with the clutch part to unclutch it from the driving member, and brake means for retarding or stopping the carrier to enable it to perform its stated function regarding the clutch part, and said brake means also acting through said carrier to retard or stop the movement of the driven member, whereby the action of the traction device operable by the driven member may be controlled.

10. A driving assembly for tractor machines, comprising a shaft, upon which the assembly is disposed, said assembly including a driving member loose on the shaft, and clutching and braking sub-assemblies at each side of said driving member each sub-assembly including a clutch part directly cooperative with the driving member, a carrier associated with said clutch part and having fixed thereto a driven member for operating a traction device, spring means intermediate the carrier and clutch part to normally hold the same in coaction with the driving member, camming means carried by said carrier for relative movement and co-operation respecting the clutch part and adapted when the carrier is retarded or stopped in movement to act on the clutch part to unclutch it from the driving member, and brake means for retarding or stopping the carrier to enable it to perform its stated function regarding the clutch part and said brake means also acting through said carrier to retard or stop the movement of the driven member, whereby the action of the traction device operable by the driven member may be controlled, and camming control means for the carriers of the two sub-assemblies above set forth for independent operation of the brake means coacting with said carriers to maintain said brake means released so that the clutch parts are effective on the driving member, and to apply either brake means to cause unclutching action of the clutch part of either sub-assembly.

11. A driving assembly for tractor machines, comprising a shaft, upon which the assembly is disposed, said assembly including a driving member loose on the shaft, and clutching and braking sub-assemblies at each side of said driving member, each sub-assembly including a clutch part directly cooperative with the driving member, a carrier associated with said clutch part and having fixed thereto a driven member for operating a traction device, spring means intermediate the carrier and clutch part to normally hold the same in coaction with the driving member, camming means carried by said carrier for relative movement and cooperation respecting the clutch part and adapted when the carrier is retarded or stopped in movement to act on the clutch part to unclutch it from the driving member, and brake means for retarding or stopping the carrier to enable it to perform its stated function regarding the clutch part and said brake means also acting through said carrier to retard or stop the movement of the driven member, whereby the action of the traction device operable by the driven member may be controlled, and camming control means for the carriers of the two sub-assemblies above set forth for independent operation of the brake means coacting with said carriers to maintain said brake means released so that the clutch parts are effective on the driving member, and to apply either brake means to cause unclutching action of the clutch part of either sub-assembly, said camming control means including a shaft, having two offstanding arms, a link extending from each arm and toggle links attached to each of said links and also attached to the ends of the brake device for one associated sub-assembly.

12. A driving assembly for traction machines, comprising a shaft, upon which the assembly is disposed, said assembly including a driving member loose on the shaft, and clutching and braking sub-assemblies at each side of said driving member, each sub-assembly including a clutch part directly cooperative with the driving member, a carrier associated with said clutch part and having fixed thereto a driven member for operating a traction device, spring means intermediate the carrier and clutch part to normally hold the same in coaction with the driving member, camming means carried by said carrier for relative movement and co-operation respecting the clutch part and adapted when the carrier is retarded or stopped in movement to act on the clutch part to unclutch it from the driving member, and brake means for retarding or stopping the carrier to enable it to perform its stated function regarding the clutch part and said brake means also acting through said carrier to retard or stop the movement of the driven member, whereby the action of the traction device operable by the driven member may be controlled, the driven member of each sub-assembly comprising a gear part having a sleeve on which the clutch part and carrier and camming means of the associated sub-assembly are mounted, and each carrier of the sub-assemblies being arranged to house the spring means that acts upon the associated clutch part.

13. A driving assembly for traction machines, comprising a driving gear journaled from said shaft, and having opposing clutch faces, sleeves journaled on said shaft at the opposite sides of said driving gear, driven means connected to the sleeves, clutches at the opposite faces of the driving gear having clutch means adapted to respectively co-operate with the clutch means of the driving gear, said clutches being keyed respectively to said sleeves, each of said clutches having an inclined plane surface, braking means journaled on each of the sleeves each surrounding the respective portion of the corresponding clutch having the inclined plane surface, and a wedge carried by each braking means located to engage the respective inclined plane surface for causing the braking means to rotate therewith under non-braking conditions, and for causing axial shifting of the respective clutch under braking conditions for releasing the engagement of the respective clutch with the clutch means of said driving gear.

14. A clutch and brake cross traction shaft unit assembly, comprising, in combination, a shaft having driving gears at each end thereof adapted to drive the traction device, a gear around said shaft driven by the power source of the machine with which the assembly is used, a pair of clutch devices between the last mentioned gear and the shaft, either of which devices is operable to effect a driving relation between the gear and shaft, said clutch device including parts slidably but non-rotatably mounted on the cross shaft, brake devices associated with the traction driving gears and surrounding said shaft, spring means around said shaft for maintaining the clutches in operative or clutching position with respect to the main driving gear, and camming instrumentalities intermediate the clutch device and braking means for causing operation of the former incident to application of the latter, said operation constituting a disengagement of the clutch member with the main driving gear.

15. In mechanism for controlling and driving traction machines of the class described, the combination with a driving gear, of driven gears for operation of the traction devices, clutch mechanisms intermediate the driven gears and the driving gears, said clutch mechanisms including parts slidably but non-rotatably mounted on a shaft, a control member, means intermediate the control member and the clutch mechanisms operable to throw either clutch mechanism out of action, brake devices associated with the driven gears, said control member also constituting means for applying braking forces through the braking devices to the driven members through said movable clutch parts after either of the clutch mechanisms has been thrown out and rendered inoperative to perform its clutching function.

In testimony whereof, I affix my signature.

ADOLPH C. MENNINGEN.